United States Patent [19]
Ubukata et al.

[11] 3,869,588
[45] Mar. 4, 1975

[54] POSITIVE OR NEGATIVE ACCELERATION OPERATED CONDUCTIVE LIQUID SWITCH FOR VEHICLE SAFETY DEVICES

[75] Inventors: Susumu Ubukata, 549, Nakasuna-cho; Yasukazu Mizutani, both of Nagoya, Japan

[73] Assignee: said Ubukata, by said Mizutani

[22] Filed: Feb. 2, 1973

[21] Appl. No.: 329,168

[30] Foreign Application Priority Data
Feb. 10, 1972   Japan.............................. 47-14491
May 11, 1972    Japan.............................. 47-47529
May 25, 1972    Japan.............................. 47-52858
June 24, 1972   Japan.............................. 47-63485
June 19, 1972   Japan.............................. 47-72330

[52] U.S. Cl............... 200/61.47, 200/220, 200/223, 200/226
[51] Int. Cl. ............................................ H01h 35/14
[58] Field of Search ........ 200/61.47, 190, 220, 221, 200/222, 223, 226, 229, 235, 236, 211-213; 307/10 R, 121

[56] References Cited
UNITED STATES PATENTS
2,195,199   3/1940   Becker............................ 200/211
2,501,787   3/1950   Rickmeyer...................... 200/222
2,560,717   7/1951   Boyer.............................. 200/211
2,786,919   3/1957   Connolly......................... 200/211
3,599,745   8/1971   Hughes...................... 200/61.47 X
3,739,191   6/1973   Nagazumi et al. .......... 200/61.47 X Primary Examiner—James R. Scott

[57] ABSTRACT

This conductive liquid switch is a novel mercury switch to be mounted on a horizontally moving apparatus such as an automobile and clearly distinguishes the condition of acceleration caused during the abnormal motion period in which the automobile is subjected to sudden acceleration or deceleration or skidding which is dangerous for the automobile from the conditions of acceleration caused during the period in which the automobile is parking, or is subjected to the usual acceleration or deceleration, or is travelling at a normal speed, thereby to open or close at least one electric circuit. This switch is activated when a predetermined value of acceleration is applied thereto in one direction for a predetermined period of time before the moving apparatus is tilted at a dangerous angle or turned upside down owing to a collision or the like, that is, the position of the moving apparatus is not different from the usual position thereof, thereby to operate an occupant's protection device such as a safety belt, an air bag, or a safety net.

8 Claims, 30 Drawing Figures

POSITIVE OR NEGATIVE ACCELERATION OPERATED CONDUCTIVE LIQUID SWITCH FOR VEHICLE SAFETY DEVICES

BACKGROUND OF THE INVENTION

This invention relates to electrical switches to be mounted on apparatuses, such as aircraft, ships, and vehicles, which will move in a horizontal direction, and more particularly to an electrical switch which employs mercury as a sensing element to respond to variation in speed or acceleration.

It is well known in the art that an electrical circuit is opened or closed by tilting a mercury switch, or especially a container including mercury. Therefore, it is readily thought of that the container, or the switch can be mounted on an automobile so that, when the automobile is tilted over the threshold value of a gradient allowed to it, an electrical circuit is opened or closed as required for the safety of the automobile.

However, this method has difficulty such as, after the automobile or the like has had a collision, tilted or turned upside down, various safety devices provided on the automobile are actuated. In this connection, consider the case where a safety device such as an air bag or a seat belt is actuated to protect a passenger or an occupant in an automobile from injuries. When the automobile is involved in an accident, it must be completed to safely secure the passenger's body to the seat by means of the safety device mentioned above before he hits a hard part, such as a windshield glass, of the automobile. However, such a switch as described above which will be actuated only when the automobile is tilted or turned upside down is useless for protection of the passenger, that is, it cannot be achieved by the switch to protect the passenger's body from injuries.

SUMMARY OF THE INVENTION

It is accordingly a first object of the invention to provide a conductive liquid switch, hereinafter merely referred to as switch in the specification as applicable for purposes of simplification, in which the condition of acceleration caused during the period in which a vehicle is subjected to sudden acceleration or deceleration, or skidding (hereinafter referred to as an abnormal motion period) is clearly distinguished from the condition of acceleration caused during the period in which the vehicle is parking, or is subjected to the usual acceleration or deceleration, or is travelling at a normal speed (hereinafter referred to as a normal motion period), thereby to close or open at least one electric circuit or vice versa.

A second object of the invention is to provide a switch which is maintained open during the normal motion period, but is closed during the abnormal motion period thereby to supply electric current to a device for securely fastening an occupant to his seat by means of a seat belt or to operate a device such as air bag for protecting the occupant from injuries.

A third object of the invention is to provide a switch for an automotive vehicle which remains closed to feed electric current to various devices necessary for driving the automotive vehicle during the normal motion period, but is opened during the abnormal motion period to interrupt the electrical circuits provided for the power source and accordingly to suspend the feeding of the electric current to the various devices for the purpose of preventing the fuel from being ignited by sparks caused by electrical short-circuiting.

A fourth object of the invention is to provide a switch for an automotive vehicle which, when the automotive vehicle is about to skid on a road upon application of an emergency brake, can control a skid preventing device which adjusts a wheel braking power to effectively provide a braking action to the extent that the skid is not caused.

A fifth object of the invention is to provided a switch for an automotive vehicle which is activated when a predetermined acceleration is applied thereto for a predetermined time period before the automotive vehicle is tilted at a dangerous angle or turned upside down owing to a collision or the like, that is, while the position of the automotive vehicle is not different from its usual or normal position.

A sixth object of the invention is to provide a switch which comprises a proper quantity of mercury contained in a sealed container and a pair of electrical conductors which will be electrically connected or disconnected by the mercury, the electrical conductors being maintained electrically disconnected for the normal motion period during which the container has its normal position, and being electrically connected when the direction of acceleration applied to the mercury is changed by tilting the container or when, with the continer mounted on a moving apparatus such as a vehicle so as to have the normal position, acceleration different from that caused during the period the container has the normal position is applied to the mercury due to the tilting or turning upside down of the vehicle.

A seventh object of the invention is to provide a conductive liquid switch which comprises switching elements for responding to at least two acceleration periods at different responsive instants and which maintains an electrical circuit open or close when acceleration having a value exceeding an acceleration responsive value (described later) is applied thereto and operates a device such as a relay for controlling an ignition coil, a lamp, a starter motor, or the like when one or all of the switching elements are operated.

An eighth object of the invention is to provide a switch comprising a container including mercury, in which the shape and position of the mercury under gravity are changed when acceleration is applied thereto in a direction perpendicular to the direction of the gravity, or in a horizontal direction, thereby to open or close an electrical circuit connected to the switch, the switch having such characteristics that it will not respond to vibratory acceleration which does not apply a predetermined acceleration thereto for a period more than a predetermined period, but will selectively respond to acceleration applied thereto in a predetermined direction for a sufficient long period.

A ninth object of the invention is to provide a switch comprising a container enclosing mercury, in which the shape and position of the mercury under gravity are changed when acceleration including components in the direction of gravity and in a horizontal direction is applied thereto, thereby to open or close an electrical circuit connected to the switch, the switch having a simple device for adjusting the sensitivity thereof.

A 10th object of the invention is to provide a switch in which the mass and cohesive force of mercury enclosed in a sealed container with a pair of conductors maintain the position and shape of the mercury definite in connection with the shape of the sealed container, and the surface tension of the mercury is ingeniously utilized so that, in the case where the switch is mounted on a moving apparatus, the mercury electrically connects or disconnects the pair of conductors for the normal motion period of the moving apparatus and actuates the switch upon application of acceleration caused during the abnormal motion period thereof, as a result of which the switch can respond to the acceleration independently of the inclination of the sealed container, or prior to the occurence of the inclination of the sealed container.

An 11th object of the invention is to provide a switch in which mercury in a container is under the acceleration of gravity caused when the container is normally positioned and can respond to acceleration in any of the directions different from the direction of the acceleration of gravity.

A 12th object of the invention is to provide a switch which is advantageous in that its acceleration responsive value can be simply set as required, its responsive time period of from applying of acceleration exceeding the acceleration responsive value till closing of the switch can be selected as desired, and, where the switch is intended to respond to acceleration in a horizontal direction by mounting it on a moving apparatus which is accompanied by vertical vibration effected for a relatively short time, that is, vibratory noise of high frequency, the switch scarcely responds to that noise.

A 13th object of the invention is to provide a switch comprising components such as a container with one open end, a pair of circular conductors, and a cylindrical body, in which a responsive acceleration value and a responsive time period can be readily set as required by properly determining the dimensions of the components and a quantity of mercury enclosed in the container.

A 14th object of the invention is to provide a switch which is correct in operation and low in cost.

The foregoing object and other objects of the invention will become more apparent from the following detailed discription and the appended claims when read in conjunction with the accompanying drawings.

DETAILED DESCRIPTION OF THE INVENTION

As conducive to a full understanding of this invention, acceleration applied to an automotive vehicle will first be described.

In an experiment in which a dummy person's body was positioned in an automotive vehicle and the vehicle was subjected to a collision with a stationary body, it was measured that the dummy person's body was subjected to deceleration of the order of 30 G (G is a unit of gravity), that is, negative acceleration (hereinafter referred to as "acceleration" for simplification) at a vehicle speed of 30 km/H and to acceleration of the order of 80 G at a vehicle speed of 60 km/H.

Accordingly, if it is assumed that the distance S between the head of the dummy person's body and the windshield glass is 60 cm, then the time T from the application of acceleration of 30 G till collision of the head with the windshield glass is:

$T = \sqrt{2S/30G} \approx 0.064$ second or 64 ms.

Therefore, the operation of an acceleration responsive switch and that of a protection device operated thereby must be completed within a considerably short period of time, otherwise a passenger or occupant in the automobile will get injured.

For instance, the acceleration measured at the position, which is best for mounting acceleration measuring device and has a least vibration, of a small passenger car whose engine has a cylinder capacity of from 1,000 to 1,500 cc, was as follows. When the car is in the period during which it is parking, or is subjected to acceleration or deceleration, acceleration of from 0.2 to 0.3 G was measured. When the car was travelling on a rough road at a constant speed of 50 km/H, acceleration of from 0.5G to 1-6 G was measured in vertical, horizontal and lateral direction. In conclusion, acceleration caused during the normal motion period of the car, that is, in the period during which it is parking, or is subjected to acceleration or deceleration, or is travelling at a constant speed was measured as 0.2 to 1.6 G.

On the other hand, acceleration during the abnormal motion period of the car, that is, when the car was applied with an emergency brake or subjected to sudden acceleration, was measured as 0.5 to 3 G at the same position, though the acceleration was variable depending on the conditions of the road, that is, whether or not the road is paved or dry.

Hereinafter, a minimum value of acceleration required for causing an acceleration responsive switch to open or close is referred to as "a responsive acceleration value." If it is assumed that 1 G is selected for the responsive acceleration value out of the acceleration range of from 0.5 to 3 G measured during the abnormal motion period, this value 1 G is within the acceleration range of from 0.5 to 1.6 G measured while the car was travelling at the constant speed, or during the normal motion period.

In this connection, studying of the vibratory acceleration caused during the period when the car is travelling at the constant speed was performed. As a result, it was found that the frequency of the vibration is from 20 and 60 Hz, and the duration of the acceleration in a certain direction is from 25 to 8 ms.

Accordingly it can be understood that a conductive liquid switch having a responsive acceleration value of 1 G is activated when acceleration of 1.6 G is applied thereto in a certain direction for, for instance, 30 ms longer than 25 ms.

Figure 1:
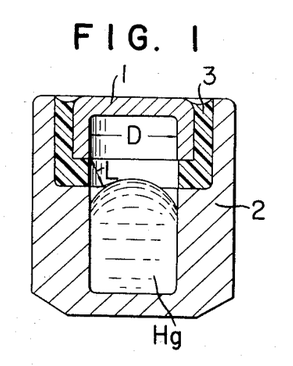
FIGS. 1, 2, 3, 7, 10, 13, 16, 19, 23, 24, 25, 29, and 30 are side elevational cutaway views illustrating various examples of the acceleration operated switch according to the invention.

Shown in FIG. 1 is an enlarged view illustrating one example of the switch according to the invention which is normally maintained open, but closed in the case when a vehicle is subjected to an abnormal motion.

The switch comprises a lid 1 made of an electrically conductive material as one conductor of the switch and a container 2 formed as the other conductor thereof. These conductors are fixedly supported by an electrical insulation material 3 filled therebetween thereby to form a sealed container having a space therein. The sealed container thus formed contains mercury Hg in the space in such a manner that there is a space between the mercury Hg and the lid 1. In the latter space an inert gas is charged, if necessary.

In FIG. 1, reference symbols D and L respectively represent the inside diameter of the lid 1 and the distance between the surface of the mercury Hg and the lower end of the lid 1 (hereinafter referred to as "a distance-between-contacts L").

The responsive acceleration value depends on the ratio K of the inside diameter D to the distance-between-contacts L. That is, the greater the ratio $K = L/D$ is, the greater the responsive acceleration value is. However, the responsive acceleration is not always simply proportional to the ratio K because of factors such as a surface tension of mercury.

The responsive time period of from the instant at which application of a predetermined acceleration exceeding the responsive acceleration value is effected to the instant at which the conductors 1 and 2 are electrically connected, depends on the distance-between-contacts L. The responsive time period is also not always simply proportional to the distance-between-contacts L because of factors such as a surface tension of mercury; however, the greater the distance between-contacts L is, the longer the responsive time period is.

Accordingly, it can be understood that the size of the container is determined from the period of vibration which is caused during the normal motion period of a moving apparatus at a place where the mercury switch is installed.

In this connection, the experimental data of relation between the dimension D and the characteristics of the switch are indicated in the following table:

| D (Unit: mm) | Responsive acceleration value (unit: G) | Responsive time period (unit: ms) | With acceleration of |
| --- | --- | --- | --- |
| 6 φ | 1.5 | 12 | 1.8 G |
| 10 φ | 1.0 | 35 | 1.2 G |
| 15 φ | 0.5 | 40 | 0.7 G |

The switch having the inside diameter $D = 6\phi$ indicated in the table will now be described. The responsive acceleration value of this switch is 1.5 G, that is, it is within the range of from 0.5 to 3 G during the abnormal motion period. The responsive time period thereof is 12 ms, which is within the range of the duration period of from 8 to 25 ms of the vibratory acceleration effected in a given direction during the normal motion period. However, the vibratory acceleration nearer to 1.6 G of the vibratory acceleration ranging from 0.5 to 1.6 G during the normal motion period is higher in frequency, and therefore the duration period in one direction is close to 8 ms.

In other words, if the responsive acceleration value of the switch is suitably selected at a point of the range of acceleration caused during the abnormal motion period, it is not always necessary for the responsive time period to be the longest time period of the duration periods of acceleration caused in one direction during the normal motion period.

More specifically, the magnitude of acceleration, which is longer in duration period than the accelerations caused during the normal motion period is often included in a lower part of the range of accelerations caused during the normal motion. This can be readily understood from the fact that the magnitude of acceleration in the mode of vibration is proportional to the product of the square of frequency and amplitude.

Figure 2:
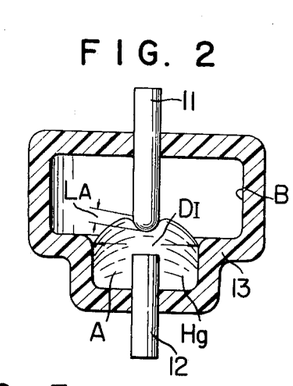

Another example of the switch according to the invention is shown in FIG. 2, which will close an electrical circuit during the normal motion period and will open the electrical circuit during the abnormal motion period.

This switch comprises two conductors respectively used as an upper electrode bar 11 and a lower electrode bar 12. These electrode bars 11 and 12 are fixedly supported by a container 13 made of an electrical insulation material so that they are spaced apart from each other as required. The container 13 has two parts A and B. The part A is smaller in inside diameter than the other part B. Mercury Hg is contained in the part A in such a manner that it electrically connects the upper electrode bar 11 to the lower electrode bar 12.

Upon application of acceleration greater than the responsive acceleration value to this switch for more than a predetermined time period, the mercury Hg is moved into the part B and is deformed, thus breaking the electrical connection between the electrode bars 11 and 12.

In this connection, the deeper the upper electrode bar 11 is inserted into the mercury, or the greater is a depth $L_A$ the greater is the responsive acceleration value. The greater the inside diameter $D_I$ of the part A the smaller the responsive acceleration value. Furthermore, the responsive time period depends on the shape of the container is because it is affected by the movement of the mercury from the part A to the part B.

The switches shown in FIGS. 1 and 2 are shaped circular in the cross-section for convenience in description; however, this circular shape is not limitative. The cross-section may be selected as desired according to the use of the switch so that the switch will respond to acceleration in a desired direction in a horizontal plane. For instance, the cross-section may be triangular if the same characteristics are required only in the three particular directions of the switch.

Figures 3, 4:
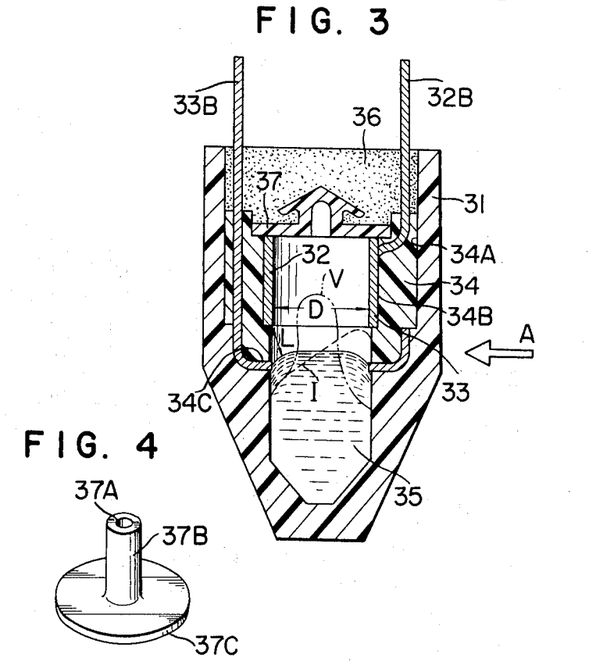
FIG. 4 is a perspective view of a member for easily obtaining the sealing of the switch shown in FIG. 3.

Shown in FIG. 3 is another example of the mercury switch according to the invention which comprises: a container 31 made of an electrical insulation material such as synthetic resin or porcelain and having the upper end open; an upper conductor 32 and a lower conductor 33, each preferably being made of metals such as iron, nickel or tungsten which is hardly eroded in mercury or of alloys of these metals; and a cylindrical structure 34 adapted to form an electrical insulation between the upper conductor 32 and the lower conductor 33 and to fixedly support these conductors.

The outside surface 34A, the inside surface 34B, and the bottom surface 34C of the cylindrical structure 34 are closely adhered to an inside surface of the container 31, the upper conductor 32, and the lower conductor 33, respectively.

In this connection, it is preferable that gaps between these closely adhered portions are made as small as possible in order to limit the quantity of mercury 35 coming into the gaps to the extent that the operational variation of the switch is within an allowable tolerance thereof, or, in contrast, the gaps should be made wide enough to readily have the mercury returned when it has come in the gaps.

The mercury of the proper quantity for this switch is as shown in FIG. 3. When the switch is normally held, there is a distance L between the free surface of the mercury 35 and the lower end of the upper conductor 32.

The switch further comprises: a sealing material 36 by which the container 31, the upper conductor 32, the lower conductor 33, and the cylindrical structure 34 are formed into one unit; and a member 37 for obtaining the easy sealing of the switch.

The sealing material 36 is a bonding agent of synthetic resin which is obtained by mixing a hardener and a filler with epoxide resin, or a material such as glass which is melted at high temperature and then hardened into a solid matter at low temperature.

For the member 37, a heat-resistive material such as iron is suitable in the case where the glass is employed as the sealing material 36, while a thermo-plastic resin is preferable in the case where the bonding agent of synthetic resin is employed as the sealing material 36.

The shape of the member 37 is initially as shown in FIG. 4. The periphery 37C of the member 37 is first subjected to adhesion with a small quantity of the sealing material 36, and after the proper quantity of mercury being poured through an inlet 37A of the member 37 into the container 31, the tube-like part 37B of the member 37 is heated and/or pressurized thereby to close the inlet 37A. Thereafter, the sealing material 36 is sufficiently filled in the container 31 and is then hardened. If necessary, after the mercury having been poured into the container 31, the air in the container 31 may be removed or may be replaced with an inert gas to protect the mercury from contamination.

Figure 5:
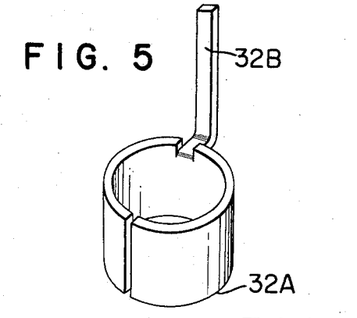
FIGS. 5 and 6 are perspective views illustrating electrical conductors employed in the switch shown in FIG. 3, respectively.
Figure 6:
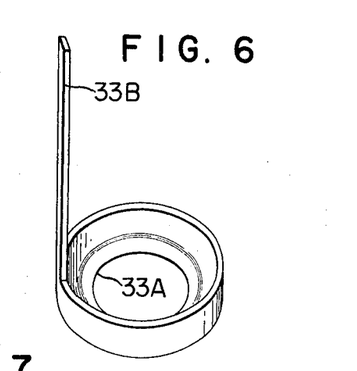

The upper conductor 32 and the lower conductor 33, as shown in FIGS. 5 and 6, have electrically conductive circular parts 32A and 33A and electrically conductive straight parts 32B and 33B, respectively. The straight parts 32B and 33B are hermetically embedded by the sealing material 36 in the container.

It is assumed that the switch shown in FIG. 3 is in its normal position. When the switch thus normally positioned is accelerated in the direction as shown by an arrow mark A (FIG. 3), the free surface of the mercury 35 will be inclined as shown by a dotted line l. When this acceleration reaches the responsive acceleration value, a part of the mercury, being raised by the inclination of the mercury, will contact the circular part 32A of the upper conductor 32, that is the straight parts 32B and 33B become electrically connected.

If it is assumed that the inside diameters D of the circular parts 32A and 33A are equal and constant, the responsive acceleration value will change with the distance L between the mercury surface and the circular part of the upper conductor 32.

In other words, the responsive acceleration value can be estimated from an angle of inclination of the mercury which is obtained by inclining the switch until the circular parts 32A and 33A become electrically connected. In a relatively small range of the inclination degrees, a ratio between the responsive acceleration value and gravity is coincident with the tangent of the angle of inclination. If the responsive acceleration value that will make the switch conductive at an inclination angle of 45° or more of the switch is greater than approximately 1 G, a responsive acceleration value estimated from the tangent of the angle of inclination actually is rather excessive. For instance, although the responsive acceleration value estimated from the tangent of 45° is 1 G, the conductive parts can be electrically connected by the mercury by applying acceleration of the order of 0.8 G in the direction of the arrow mark A. Furthermore, the responsive acceleration value estimated from 71.5° is 3 G, but actually the conductive parts can be electrically connected by the mercury by applying acceleration of the order of 2 G in the direction of the arrow mark A. Accordingly, it can be seen that the responsive acceleration value estimated from the tangent of the angle of inclination of the switch is different from that obtained by applying acceleration in the direction of the arrow mark A. This difference is due to the effect of a surface tension of mercury and therefore a degree of the difference changes with the size of the switch, the quantity of the mercury, and especially the meniscus of the mercury.

The responsive time period ms (1/1000 second) of from the application of acceleration over the responsive acceleration value to the switch till the closing of the switch can be obtained as required by properly determining the diameter D of the circular parts of the conductors. According to experiments on this, the relationships between the diameter D and the responsive acceleration value and the responsive time period are as indicated in the following table:

| D (mm) | Responsive acceleration value (G) | Responsive time period (ms) | With acceleration of |
|---|---|---|---|
| 6 φ | 2 | 10 | (2.5 G) |
| 15 φ | 2 | 45 | (2.5 G) |
| 6 φ | 0.5 | 7 | (0.7 G) |
| 15 φ | 0.5 | 40 | (0.7 G) |

Figure 7:
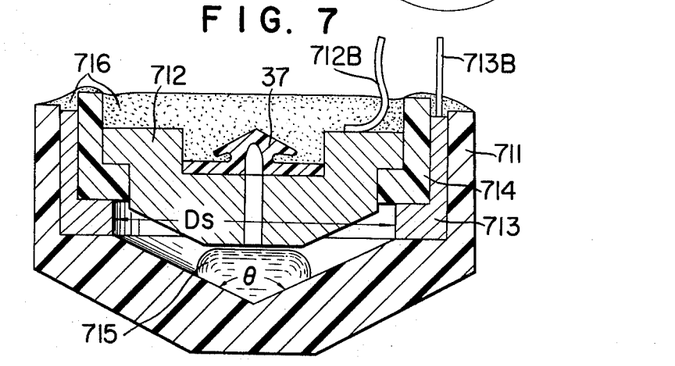

If it is desirable to make the responsive acceleration value relatively low and to make the responsive time period relatively long, the shape of the switch should be made relatively flat. Such a switch is shown in FIG. 7.

This switch comprises: a container 71 having its upper end opened; an upper conductor 712; a lower conductor 713, a cylindrical structure 714 adapted to electrically insulate the upper conductor from the lower conductor and to fixedly support them; mercury 715; a sealing material 716; and a member 37 for easily obtaining the sealing of the container 711.

The upper conductor 712 is provided with a lead wire 712B welded thereto, while the lower conductor 713 is also provide with a lead wire 713B.

In this switch, the responsive time period depends on the inside diameter $D_s$ of the lower conductor. That is, the greater the inside diameter is, the longer the responsive time period is; or the smaller the inside diameter is, the shorter the responsive time period is. Furthermore, the responsive acceleration value depends on an angle $\theta$ formed in the bottom of the container. That is, the smaller the angle $\theta$ is, the greater the responsive acceleration value is; or the smaller the angle $\theta$ is, the greater the responsive acceleration is.

In case when the switch shown in FIG. 3 is vibrated up and down in a vertical direction, the surface of the mercury sometimes swells as shown by a phantom line V. In this case, even if the magnitude of the acceleration of this vertical vibration is smaller than the responsive acceleration value, the wave formed by the swelling of the mercury, depending on the period of the vibration, may sometimes rise higher than the lower end of the upper conductor 32 thereby causing an erroneous operation of the switch. In order to prevent this erroneous operation, the lower part of the upper conductor is made hollow.

Figure 8:
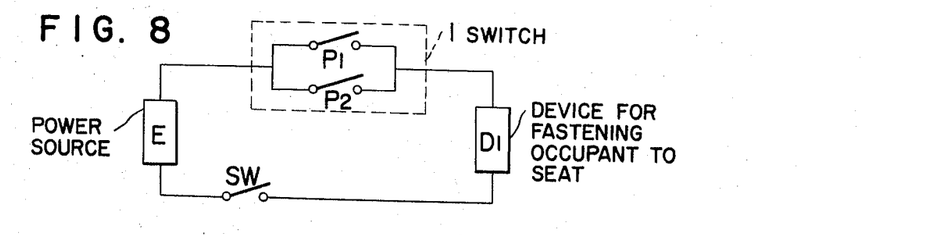
FIGS. 8 and 9 are block diagrams illustrating the connection of the switches according to the invention.

FIG. 8 shows a block diagram illustrating an embodiment of the switch according to the invention. The switch 81 comprises two switching elements $P_1$ and $P_2$ connected in parallel to each other. The switching element $P_1$ is normally open switch which will be closed only when relatively high acceleration of, for instance, more than 2 G is applied thereto for a short duration period, for instance, 8 ms less than 0.01 second. The switching element $P_2$ is also a normally open switch which will be closed only when a relatively low acceleration of, for instance, 0.5 G is applied thereto for a long duration period, for instance, 0.05 second.

The circuit shown in FIG. 8 further comprises a power switch SW, a power source E and an occupant securing device $D_1$ which operates to fixedly fasten an occupant to his seat in a vehicle when electric current is applied thereto and to release him when the electric current is interrupted.

The switching elements $P_1$ and $P_2$ of the switch 81 are connected in parallel to each other as described above, and serve to control the supply of current from the power source to the occupant securing device $D_1$. That is, when any one of the switching elements $P_1$ and $P_2$ is closed, current is fed to the occupant securing device $D_1$. It can be readily understood that the condition for closing the switching element $P_1$ is the value of acceleration caused during the abnormal motion period of a vehicle as described previously, whereas the condition for closing the switching element $P_2$ is the period of time of acceleration continuously applied to the switch which is caused only during the abnormal motion period of the vehicle.

The acceleration responsive switches described with respect to FIGS. 1, 3 through 7 may be used as the switching means in the circuit shown in FIG. 8. That is, the switches shown in FIGS. 1 and 3 may be used as the switching element $P_1$ in FIG. 8 which is actuated by the application of high acceleration for a short time, while the switch shown in FIG. 7, as the switching element $P_2$ in FIG. 8 which is actuated by the application of low acceleration for a long time.

Figure 9:
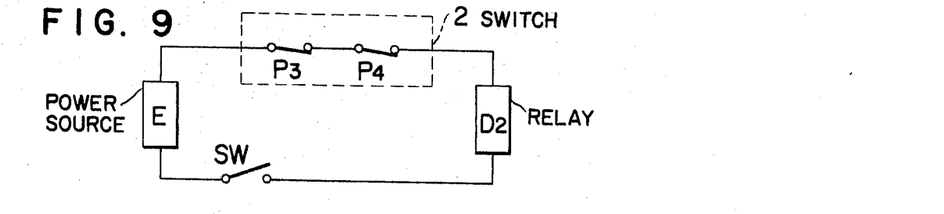

Shown in FIG. 9 is also a block diagram illustrating another embodiment of the switch, or the acceleration responsive switch 92 according to the invention. This switch 92 comprises two switching element $P_3$ and $P_4$ which are connected in series to each other and are normally closed switches which, upon closing of a power switch SW connected to a power source E, will supply electric current from the power source E to a suitable device $D_2$ such as an ignition coil, a lamp, a starter motor, and an occupant securing device which does not secure an occupant to his seat in a vehicle during the period of time when electric current is applied thereto but fixedly secures him to the seat when the electric current is interrupted. The switching element $P_3$ is so designed that it will open when a relatively high acceleration is applied thereto for a short time, while the switching element $P_4$ is so designed that it will open when a relatively low acceleration is applied thereto for a long period.

Figure 10:
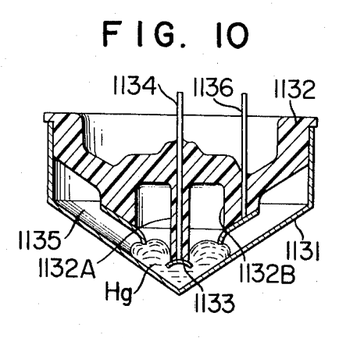

One preferable example of the switch 92 shown in FIG. 9 is illustrated in FIG. 10 which comprises: a container 1131 made of an insulating material such as porcelain which is not eroded by mercury and having a bottom part and a cylindrical part; and a sealing member 1132 made of an electrical insulating material and fixedly inserted in the container 1131 to form a sealed switch.

The sealing member 1132 has a protruded portion 1132A at the center through which a conductor 1134 is provided. The lower end of the conductor 1134 is provided with a first electrode 1133 fixedly connected thereto. There is a space 1132B around the protruded portion 1132A. Reference 1135 is a ring-shaped second electrode confronting the bottom part of the container 1131 at a fixed distance therefrom and fixed to the sealing member 1132. A conductor 1136 is connected to the ring-shaped electrode 1135. A proper quantity of mercury Hg is contained in the bottom part of the container so that it is in contact with the second electrode 1135, that is, the mercury closes the space 1132B provided around the protruded portion 1132A.

Figure 11:
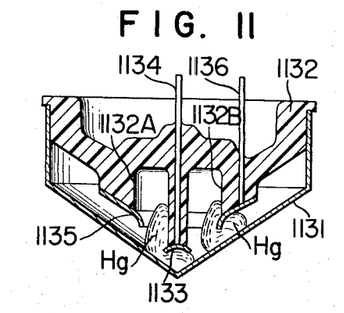
FIGS. 11 and 12 illustrates the movement of the mercury contained in the switch shown in FIG. 10.

The operation of this switch will be described with reference to FIGS. 11 and 12. When the switch is held as shown in FIG. 10, or in a normal position, the conductors 1134 and 1136 are electrically connected or short-circuited by the mercury Hg. However, if relatively high acceleration is applied to it in a horizontal direction for a short time, the mercury will be deformed and raised into the space 1132B as shown in FIG. 11, and at the same time separated into two parts by the narrow space formed by the interior surface of the container 1131 and the first electrode 1133, thereby to interrupt the electrical connection of the conductors.

In the case when relatively low acceleration is applied to the switch for a short time, the mercury will be swung a little, but it will maintain the short-circuit of the first electrode 1133 and the second electrode 1135, and soon it will restore back to its initial condition.

Figure 12:
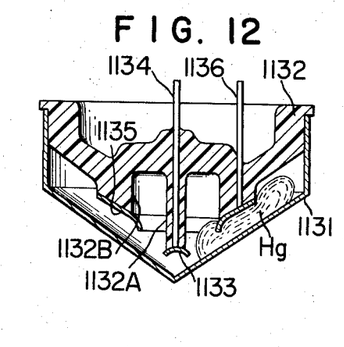

When the relatively low acceleration is applied to the switch for a long time, flowing, or raising, of the mercury is continuously effected thereby to interrupt the electrical connection of the first and second electrodes as shown in FIG. 12.

Two switches shown in FIG. 2 can be used as the switching elements $P_3$ and $P_4$ of the acceleration responsive switch 92 shown in FIG. 9. If, in this case, these two switches are made different in responsive time period and responsive acceleration value from each other so that one of the two switches opens its electric circuit when relatively high acceleration is applied thereto for a short time while the other switch opens the circuit when relatively low acceleration is applied thereto for a long time, it will achieve the first and seventh objects of the invention.

The specific characteristic of the examples described above with respect to FIGS. 8 through 12 resides in that operating characteristics of the switching element which will operate when a relatively high acceleration is applied thereto for a short time and those of the switching element which will operate when a relatively low acceleration is applied thereto for a long time, are utilized so that the switching means will not respond to acceleration caused during the normal motion period, but will respond to acceleration caused during the abnormal motion period, thereby interrupting the current supply from the power source to an ignition coil, a lamp, a starter motor, and the like to prevent the occurence of accidents and to secure the safety of the occupant.

For instance, in the case where an acceleration responsive switch having only the switching element which will operate when a relatively low acceleration is applied thereto for a long time is employed, if it is assumed that a minimum value of responsive acceleration is 0.5 G, the responsive time period in the application of acceleration of 2G is naturally shorter than that in the application of 0.5 G, that is, shorter by $\sqrt{0.5G/2G} = \frac{1}{2}$, through this calculation is rough for correct comparison. However the former cannot be one-half or less as shorter as the latter because practically there is an initial operational loss with the switch.

However, this difficulty can be solved by the present invention described with reference to FIGS. 8 through 12, in which acceleration caused during the normal motion period of a moving apparatus and that caused during the abnormal motion period thereof are measured and the data of this measurement are analyzed whereby the responsive acceleration values and the responsive time periods of the switching elements are determined to have values for distingushing these accelerations from each other.

Therefore, in the case where the responsive time period, at 0.5 G, of the switch which responds to the relatively low acceleration is set at 50 ms so as not to sense the acceleration caused during the normal travelling period of the vehicle, if acceleration of 2 G is applied thereto for a sufficiently long time, the responsive time period will become 25 ms or more. However, this is not adequate as the responsibility of the switch for the accident prevention. Thus, it can be said that the use of two switching element is effective.

Figure 13:
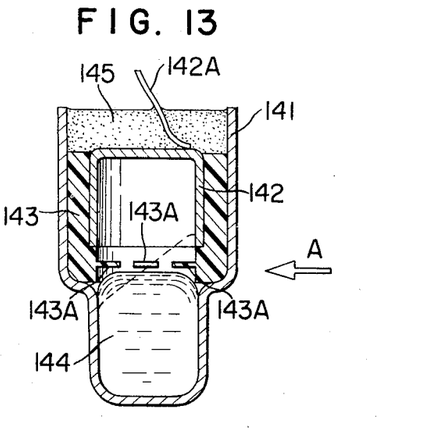

Shown in FIG. 13 is another example of the switch according to the present invention which comprises: a container 141, or a first electrode, made of an electrically conductive material which will not eroded by mercury; a second electrode 142 made in the form of a cylinder and having a conductor 142A; an insulating cylinder 143 adapted to support the electrodes 141 and 142 so that these are spaced at a certain distance; and mercury 144. This switch is sealed by a sealing material 145 so as to separate the interior space of the switch from the air.

The cylinder 143 has four protruded portions 143A which are formed in the shape of a jagged shelf and arranged near the surface of the mercury 144 by welding or the like. When only the gravity is applied to the switch under the normal conditions of the switch, that is, no acceleration in a horizontal direction be applied thereto, the shape of the mercury is maintained as shown by the solid line in FIG. 13.

As is apparent from FIG. 13, under the normal conditions, the switch is maintained open.

Now, when a predetermined value of acceleration is applied to the switch in the direction of an arrow mark A for a predetermined period of time, the shape of the mercury 144 will be deformed as shown by the dotted line, that is, the mercury is raised above the protruded portions 143A, passing through the gaps formed therebetween. As a result, the mercury will contact the second electrode 142.

If the protruded portions 143A is not provided in the switch and acceleration is applied to the switch in a horizontal direction for a short period, or the direction of acceleration applied to the switch changes from the direction of the arrow mark A to the opposite direction within a short period, that is, the switch is subjected to vibration in a horizontal direction; the surface of the mercury will be raised as a wave, or a ball-shaped mercury will be separated from the mercury 144, as a result of which the electrodes 141 and 142 will be short-circuited.

Accordingly, instead of the desirable fact that the switch is operated by acceleration of a predetermined value continuously applied for a predetermined period of time, the switch is caused to operate when the operation of the switch is not required, that is, the erroneous operation is caused by a so-called noise. Thus, the provision of the protruded portions prevents the erroneous operation of the switch.

Figure 14:
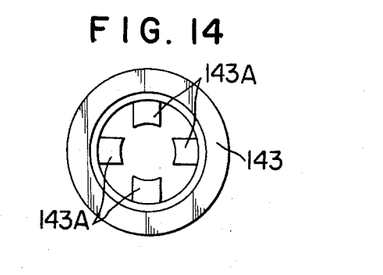
FIG. 14 is a plan view of the switch illustrating protruded portions provided as means for controlling the movement of mercury.
Figure 15:
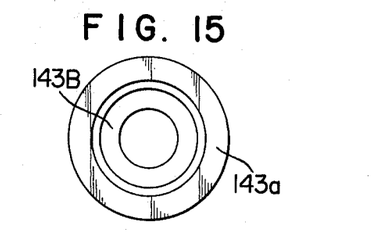
FIG. 15 is a plan view for illustrating another example of the protruded portion.

Shown in FIG. 14 is a cylinder 143a which is provided with a ring 143B in place of the protruded portions 143A (FIG. 15). A switch provided with such a cylinder 143a is not preferable because the operating characteristic of the switch is varied by the provision of the ring 143B.

An experiment was carried out on three switches which were made by reducing their dimensions in proportion to the dimensions of FIG. 13 so that the inside diameter of the second electrode 142 be 5.5 mm. A first one, or a sample A, of the three switches was made without the protruded portions 143A. A second switch, or a sample S, had the protruded portions 143A. A third one, or a sample B had the ring 143B. The result of the experiment is as indicated in the following table.

| Test | Test conditions | Sample A (5.5 $\phi$) | Sample S Protruded portion: 1.5 mm wide × 1.5 mm long | Sample B Inside dia. of ring 143B: 3$\phi$ |
|---|---|---|---|---|
| Responsive time period (when acceleration described right is continuously applied in the direction of the arrow mark A) | 1.5 G | Operated in 0.015 second | Operated in 0.016 second | not operated |
| | 3.0 G | Operated in 0.011 second | Operated in 0.011 second | Operated in 0.020 second |
| Vibration-resisting characteristic (when mounted on the body of a small passenger car) | Travelling 500 m. of a rough road, at a speed of 40 km/h. | The average number of operations in five travellings (chattering) 22 times | The average number of operations in five travellings (chattering) 1.5 times | The average number of operations in five travellings (chattering) 1.7 times |

—Continued

| Test | Test conditions | Sample A (5.5 φ) | Sample S Protruded portion: 1.5 mm wide × 1.5 mm long | Sample B Inside dia. of ring 143B: 3φ |
|---|---|---|---|---|
| Responsing characteristic under abnormal conditions (when mounted on the body of a small passenger car) | While driving on a dry smooth or flat road at a speed of 50 km/h, a passenger car is suddenly braked. | With slipping of the order of 1 m, the speed of the car was 35 km/h and the switch was operated | With slipping of the order of 1 m, the speed of the car was 35 km/h and the switch was operated. | With slipping of 8 m, the car stopped completely, but the switch was not operated. |

As is apparent from the table shown above, when compared with the sample A, the sample S improved not to cause the erroneous operation is approximately the same in responsive time period; however the sample B is extremely inferior in the responsive time period to the other samples. The samples S and B are much improved in the vibration-resisting characteristic when compared with the sample A. In the test on the switching operation in case of an emergency, that is, in the case of application of an emergency brake, the sample B did not operate.

In other words, the sample S made in accordance with FIG. 13 showing such an outstanding characteristic in selectivity, will make no erroneous operation against vibration caused in vertical and horizontal direction without being affected by the range of the responsive time period (that is the period of time of from application of acceleration in one direction till starting of the operation of the switch) which is the characteristic necessary for the acceleration responsive switch and the responsive acceleration value (that is the magnitude of the minumum acceleration for operating the switch).

In the switch having the ring 143B, if the diameter of the ring 143B is increased to the order of 5.5 mm, the inside diameter of the second electrode and the diameter of a lump of mercury will be also increased. Therefore, such a switch is variable in the responsive time period and the responsive acceleration value and is inferior in vibratory acceleration caused in vertical and horizontal directions.

Accordingly, it is difficult for the switch to have a desired characteristic without the protruded portions. This is because that the factor for determining the responsive time period depends on the spatial distance between the surface of the mercury and the second electrode 142, while the responsive acceleration value depends on the distance of a vertical component of from the surface of the mercury and the second electrode 142 with respect to the inside diameter of the second electrode 142 (in the case when the diameter of the lump of mercury is approximately the same as the inside diameter of the second electrode).

When acceleration is applied to the switch in the direction completely opposite to the direction of the gravity, or, when the switch is positioned upside down, it depends on the quantity of the mercury and the volume of the space in the container whether or not the switch is opened or closed.

Another example of the switch according to the invention will be described with reference to FIG. 16 which is suitable for setting the responsive acceleration value relatively low. This switch comprises: a container 1710 made of an electrical insulating material; a first electrode 1711 made of a steel plate by pressing and provided with several protruded portions 1711A; a second electrode 1712 fixedly inserted in the container 1710 and having a conductor 1712A; an insulating cylinder 1713 for positioning the first and the second electrode 1711 and 1712 at a predetermined distance; a proper amount of mercury 1714; and a sealing material 1715 for sealing the container. The bottom part of the container 1710 is shaped conical and the inclination or vertical angle of the conical bottom affects the responsive acceleration value of the switch.

Since the first electrode 1711 occupies a part of the upper part of the sealed container, in the case the protruded portions 1711A formed from the first electrode by pressing, these should be reinforced. Therefore, the protruded portions are separately made as metal plate, which are fixedly welded to the first electrode 1711.

The number of the protruded portions 1711A is optional. It is desirable to provide them in four direction for the vibrations in the front and rear, and right and left directions. However, in order to prevent the erroneous operation of the switch with respect to the vibration in a particular direction, the protruded portions can be provided only in the particular direction. The protruded portions 1711A may be protruded from the bottom part of the container 1710 for the same result.

Figures 16, 17:
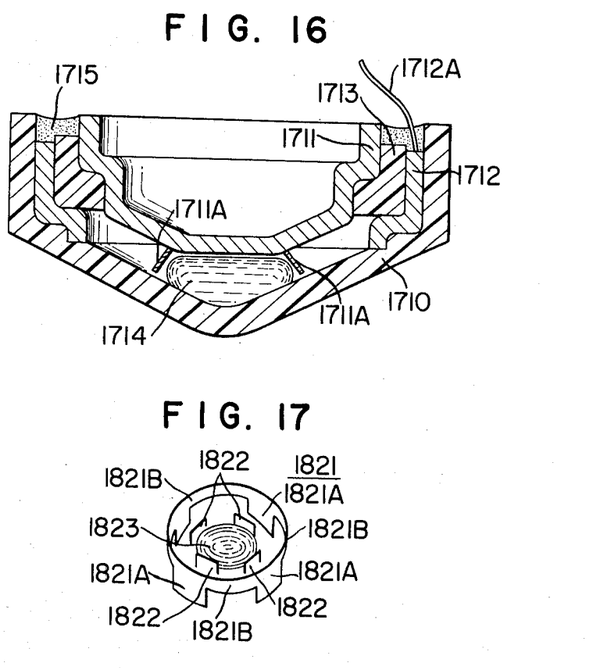
FIGS. 17 and 18 are perspective views illustrating other examples of the means for controlling the movement of mercury.

Another example of the protruded portions is shown in FIG. 17 which briefly illustrates the relationships between the protruded portions, mercury held therein, and an electrode.

When viewed from the center of the electrode 1821, if the protruded portions 1822 and mercury contacting pieces 1821A are arranged coincidently on radial lines, the effect of preventing erroneous operations of the switch caused by vibratory acceleration will increase.

The electrode 1821 comprises contacting pieces 1821A for coming in contact with the mercury when the acceleration is applied to the switch, and connecting portions 1821B for connecting these contacting pieces 1821A.

It is preferable that the connecting portions 1821B are insulated so that they are not directly in contact with the mercury in the container. The connecting portions 1821B are means for fixing the contacting pieces 1821A in the container. Reference 1823 is the mercury which is in contact with the other electrode (not shown).

Under the conditions as shown in FIG. 17, if a proper value of acceleration is applied to the switch for a proper period of time, the mercury will flow through the gaps between the protruded portions 1822 and come in contact with the contacting piece 1821A, thus short-circuiting a pair of electrodes.

Figure 18:
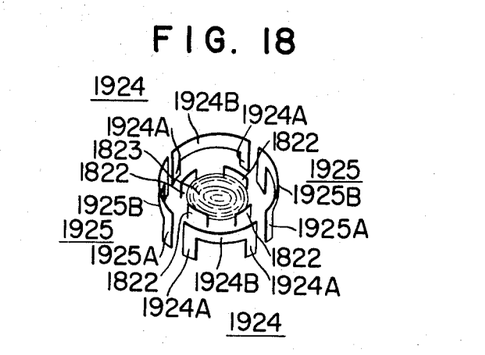

Shown in FIG. 18 is one modification of the device shown in FIG. 17. The modification comprises protruded portions 1822 and mercury 1823 which are equivalent in effect to those shown in FIG. 17. It further comprises pairs of electrodes 1924 and 1925 which are somewhat different from the electrodes shown in FIG. 17. These electrodes 1924 and 1925 respectively have contacting pieces 1924 A and 1925 A and connecting portions 1924B and 1925B which are secured in the container so that they are not in contact with the mercury. In this case also, the switch having such a modification will not be activated by vibratory acceleration, but will be activated by predetermined acceleration continuously applied for a certain period thereby to short-circuit the electrodes 1924 and 1925.

The switches shown in FIGS. 13 through 18 are maintained normally open, but are closed when a predetermined value of acceleration is applied thereto in a horizontal direction. However, these switches can be readily modified into switches which are normally closed, but are opened when predetermined acceleration is applied thereto.

Such a switch can be made by arranging a pair of electrodes insulated from each other so that these electrodes are in contact with mercury under the normal conditions and when the mercury is deformed by the application of the responsive acceleration, at least one of the electrodes breaks contact with the mercury.

The switches described with respect to FIGS. 13 through 18 are circular in the cross section for convenience in description, which is preferable so that the switch responses to acceleration applied thereto in a horizontal direction because in this case the characteristic of the switch does not change. However in the case where accelerations are applied to the switch in the particular directions which form, for instance 90° with each other, the cross section of the switch may be square. Further, if the particular directions from 120° with one another, the cross section of the switch may be triangular.

Figure 19:
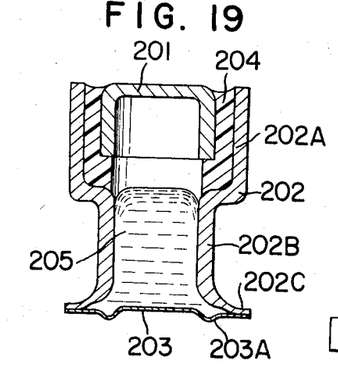

Another example of the switch according to the invention is illustrated in FIG. 19 which comprises: a first electrode 201 made of electrically conductive material such as iron and an alloy of iron and nickel which will not be eroded by mercury; and a second electrode 202 made of material such as iron. The first electrode 201 is made in the form of a lid, while the second electrode 202 is made in the form of a cylinder having a part 202A of a larger diameter, a part 202B of a smaller diameter, and a flange 202C. The thickness of the flange 202C is thinner than those of the parts 202A and 202B.

This switch further comprises: a thin bottom plate 203 along the the periphery of which a wave-shaped portion 203A is formed, the thin bottom plate 203 being fixedly connected to the flange 202C by welding or the like; an electrical insulating filler 204 of glass, porcelain or synthetic resin; and mercury 205.

These parts or materials are assembled to form the switch in the form of a sealed container. The process of fabricating the switch will be described.

Figure 20:
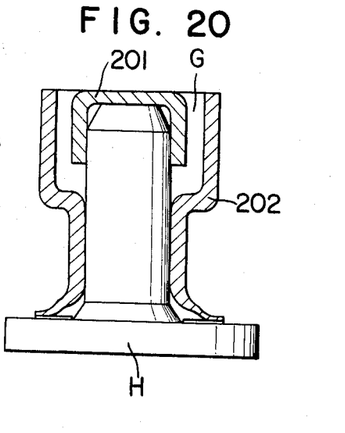
FIGS. 20, 21, and 22 are explanatory drawings for illustrating a method of fabricating and adjusting the switch shown in FIG. 19.

First, the first electrode 201 and the second electrode 202 are held at predetermined positions by a holding tool H, as shown in FIG. 20. Then, the filler is filled in the space G between the first electrode 201 and the second electrode 202. In the case when glass is employed as the filler, glass powder or pellet is first filled in the space and then heated until it is melted and fixedly adhered to the first and the second electrode. Then, after the first electrode 201 and the second electrode 202 have been fixedly secured by cooling the melted glass, the holding tool H is removed, thereby forming a structure like a container. Therefore, it is desirable that the holding tool H is made of refractory or heat-resisting material like carbon which can be readily separated from glass, or the holding tool H is coated with an agent for easily separating it from the glass.

In the case when epoxide resin is employed as the filler, the process of securing the electrodes with the epoxide resin is roughly the same as in the glass except that heating conditions are different.

After cleaning the inside of the container-like structure, a proper quantity of mercury 205 is poured into the structure through the flange 202C that is the opening end of the structure, the bottom plate 203 is correctly placed on the flange 202C, and the flange and the bottom plate are then welded by applying a large electric current so as to close the container-like structure.

Figure 21:
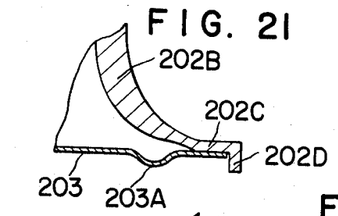

This closing of the structure may be achieved by other methods. For instance, as shown in FIG. 21, if the flange 202C is extended to form a protruded portion 202D, the bottom plate 203 can be secured on the flange 202C by squeezing the protruded portion 202D or applying synthetic resin such as epoxide resin along the protruded portion, thus forming a sealed container.

It is preferable to seal the container-like structure in the particular atmosphere such as hydrogen gas or inert gas because it will minimize contamination of the mercury.

Referring back to FIG. 19, under the normal conditions, there is a space between the first electrode 201 and the second electrode 202, that is, these electrode are not short-circuited. However, when acceleration is applied to the switch in a horizontal direction or in the direction opposite to that of the gravity, the shape of the mercury 205 will be deformed, or the position thereof will be changed. That is, the mercury will be moved aslant or moved to the first electrode 201 side, as a result of which the mercury simultaneously contacts both of the electrodes thereby shorting the latter.

In the acceleration responsive switch, as shown in FIG. 19, having a circular cross-section, the characteristics of a responsive acceleration value and responsive time period thereof, described above depend on variation or fluctuation of the inside diameter of the container-like structure and fluctuation of the distance between the lower end of the first electrode 201 and the surface of the mercury 205 in the switch correctly positioned under the normal conditions. That is, the responsive acceleration value and the responsive time period will change with the distance.

The inside diameters of high accuracy of the electrodes 201 and 202 can be readily manufactured, and therefore fluctuation of the quantity of the mercury and that of the filler are left as important factors. It is possible to obtain the inside diameter of the filler 204 approximately the same in accuracy as the electrodes forming the interior space in the container-like structure, if the treatment of the filler, namely, glass or synthetic resin, is controlled in consideration with the effect of contraction caused when it is solidified. The distance, which is one of the dimensions of the filler, between the electrodes 201 and 202 affects the dielectric strength of the switch. Since the cross-sectional area of the container-like structure is proportional to the square of the inside diameter of the cylindrical part, or the second electrode 202 where the mercury is contained, the fluctuation of the diameter will considerably affect the distance between the surface of the mercury and the first electrode 201 even if it is slight.

In other words, the fluctuations of the inside diameters of the electrodes 201 and 202 and the fluctuation of the inside diameter of the filler 204 will cause the variation of volume of the interior space in the sealed switch, even if the fluctuations are not so great as to considerably affect the operating characteristics of the switch. A geometrical error of this variation and the variation in controlling the quantity of the mercury will considerably change the distance between the surface of the mercury and the first electrode 201. Thus, it can be seen that the fluctuations of the inside diameters of the electrodes and the filler are main factors which will lower the characteristics of the acceleration responsive switch.

Figure 22:
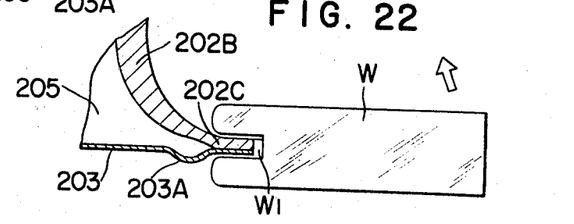

Therefore, in order to adjust the volume of the interior space in the sealed switch, an adjusting tool W as a shown in FIG. 22 is used. The bottom plate 203 and the flange 202C are inserted in a groove $W_1$ of the adjusting tool W, which is turned upwards or downwards for adjusting the volume of the interior space in the switch.

By turning the adjusting tool upwards, or in the direction of the arrow mark, the flange 202C is bent, and the bottom plate 203 is inflated outwards in the form of a dish, thereby increasing the volume described above where the mercury is contained. In contrast, by turning the adjusting tool downwards, or in the direction opposite to the direction of the arrow mark, the volume will decrease. In this connection, it is preferable that an even and uniform force is exerted to the whole periphery of the flange 202C in bending it.

Figure 23:
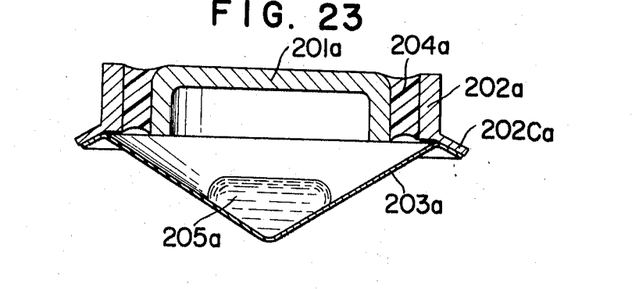

Shown in FIG. 23 is another example of the switch according to the invention. The switch shown in FIG. 19 is suitable for the case where relatively high responsive acceleration of the order of, for instance, 1 G or more is applied thereto in a horizontal direction.

It is possible to make this type of switch (FIG. 19) response the acceleration of the order of 0.5 G; however it will have difficulty such as inferior vibration-resisting characteristic because the distance between the surface of the mercury and the first electrode 201 is smaller.

The switch shown in FIG. 23 is provide according to the invention to solve the difficulty described above, which comprises; a first electrode 201a made in the form of a lid; a second electrode 202a made in the form of a cylinder; a bottom plate 203a; a filler 204a; and mercury 205a. These components forms a sealed container, or the switch, in the same manner as in FIG. 19.

The bottom plate 203a is made in the form of a cone, and the gradient of the plate 203a, or a conical angle, will determine the responsive acceleration value of this switch.

The responsive acceleration value can be adjusted by turning the adjusting tool W upwards or downwards in the same manner as described with respect to FIG. 22. More specifically the gradient of the plate 203a is changed by turning the adjusting tool W upwards or downwards, thereby adjusting the responsive acceleration value and the responsive time period.

This type of switch can make great the ratio of the volume of the interior space to the quantity of the mercury, and therefore the characteristic of the switch is affected by the fluctuation of the quantity of the mercury, but the affection is relatively little.

Figure 24:
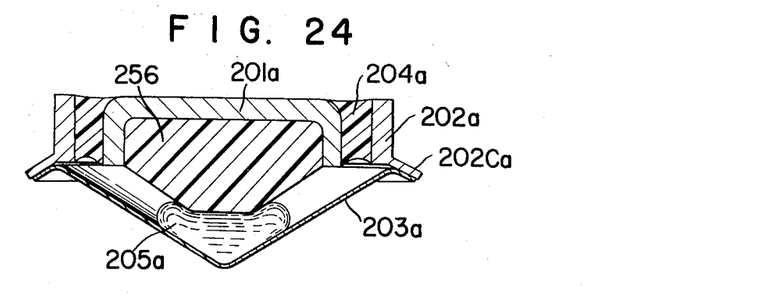

In the switch shown in FIG. 23, the distance between the free surface of the mercury 205a and the first electrode 201a is relatively great, and it is therefore liable to cause the mercury to splash or jump when the switch is vertically vibrated, as a result of which the switch will have erroneous operation. This trouble can be avoided by providing a conical structure 256 in the space under the first electrode 201a as is shown in FIG. 24. By the provision of the conical structurer 256, the electrodes 201a and 202b can be short-circuited without increasing the quantity of the mercury.

Figure 25:
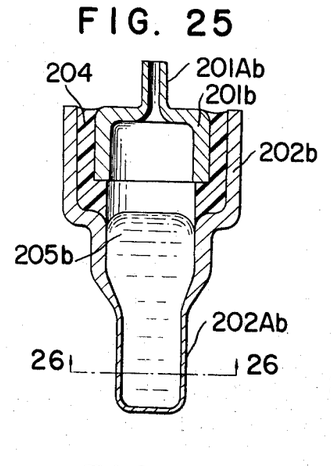

With reference to FIG. 25, there is shown another example of the switch. In this example, the shape of the cross-section of a container of mercury is changed to adjust the cross-sectional area thereof thereby to raise or lower thet surface of the mercury. The operation of this switch is similar to that of the switch shown in FIG. 19, and the construction of the switch (FIG. 25) is also similar to that of the switch shown in FIG. 19 except that the cylindrical structure, or the second electrode 202, is replaced with a container, or a second electrode 202b, having a bottom and the first electrode 201 is replaced with a first electrode 201b having a thin tube 201Ab. In FIG. 25, reference 205b is mercury and reference 204 is a filler.

Figure 27:
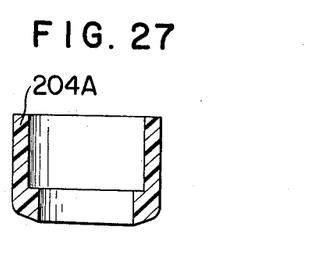
FIGS. 27 and 28 are explanatory drawing illustrating a method of fabricating the switch shown in FIG. 25.

In the case where glass is employed as the filler 204, the glass is molded as a pellet 204A whose dimensions allow it to properly be inserted between the first electrode 201b and the second electrode 202b as shown in FIG. 27. Then, these components, namely, the electrodes 201b and 202b, and the pellet 204A are assembled into one unit, and then the unit is heated in a heating device such as an induction type heating furnace thereby especially heating the metal parts, or the electrodes, of the unit. In this case, the surface of the pellet contacting the surfaces of the metal parts should be melted in such a manner that the shape of the pellet is not deformed, thereby to closely adhered to the surfaces of the metal parts.

Figure 28:
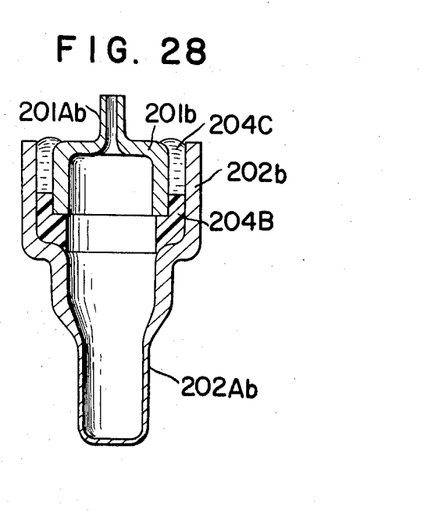

In the case where a filler having a heat-resisting property and an air-tight property which are lower than those of glass can be used, the relative position of the electrodes 201b and 202b is fixed by a spacer 204B made of an electrical insulating material as shown in FIG. 28, and then a liquid bonding agent 204c of epoxide resin is poured into the space formed by the electrodes 201b, 202b and a spacer 204b. Thereafter, the liquid bonding agent 204c is solidified to fixedly secure the electrodes and the spacer. Then, after a proper quantity of mercury being poured through the thin tube 201Ab, a proper gas is filled in the container 202b if necessary. After this, the thin tube 201Ab is squeezed and sealed by, for instance, welding, thereby forming a sealed container, or the switch.

Figure 26:
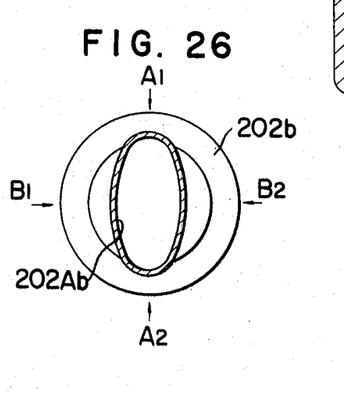
FIG. 26 is a cross sectional view taken along line 26–26 of FIG. 25.

The cross-section of the lower part 202Ab of the container 202b is elliptical as shown in FIG. 26. When forces are exerted on the lower part 202Ab in the directions of arrow marks $A_1$ and $A_2$, the cross-sectional area thereof will increase. In contrast, when forces are exerted on the lower part 202Ab in the directions of arrow marks $B_1$ and $B_2$, the cross-sectional area will decrease. Thus, the operating characteristics of the switch can be changed as desired, or can be set within the desired range of the operating characteristics. The directions of the forces acting to the lower part 202Ab is straight in FIG. 26, however the lower part 202A*b* may be twisted for adjusting the cross-sectional area and accordingly the volume of the container 202*b*.

Figure 29:
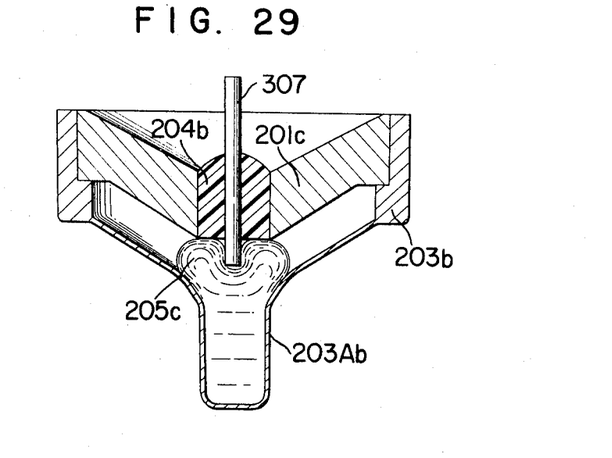

Another example of the switch according to the invention is shown in FIG. 29. The shape of this switch is somewhat similar to those of the switches shown in FIGS. 23 and 24 which are suitable for a low responsive acceleration value. However, the switch shown in FIG. 29 is different from these shown in FIGS. 23 and 24 in the switching method. That is, it is normally closed, but is opened when acceleration is applied to the switch in a horizontal direction.

This switch comprises: a lid 201*c* which secures a first electrode 307 with the aid of a filler 204*b* of electrical insulating material at the center of the lid; and a bottom plate 203*b* is joined to the lid 201*c*, thereby forming a sealed container. The bottom plate 203*b* has an adjusting part 203A*b* which is relatively thin in thickness. The sealed container includes a proper quantity of mercury 205*c*. The adjusting part 203A*b* has the same function as the lower part 202A*b* shown in FIG. 25.

Figure 30:
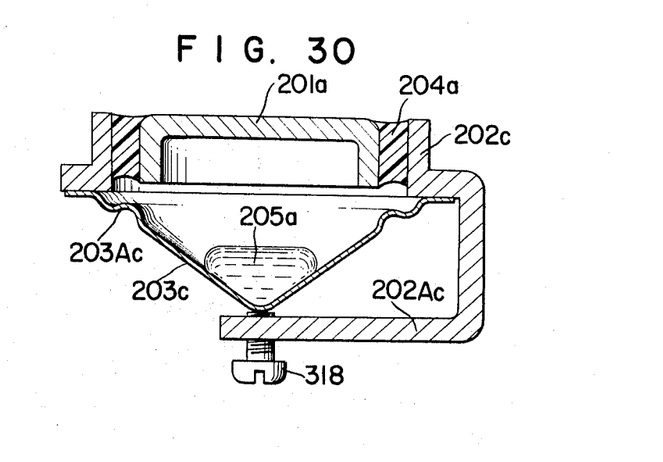

If it is required to provide an acceleration responsive switch which, as shown in FIG. 30, is normally closed, but will open in operation and which has a relatively high responsive acceleration value, such a switch can be fabricated by increasing the gradient of the bottom plate 203*b*.

Shown in FIG. 30 is another example of the switch according to the invention. The sensitivity adjusting range of this switch is greater than those of the examples previously described. In addition, this switch is very high in adjusting accuracy and has means for varying the characteristics thereof. Some of the switches previously described have such means, but it is of the semi-fixed type.

The switch shown in FIG. 30 comprises a lid 201*a*; filler 204*a*; and mercury 205*a* which are respectively equivalent to those shown in FIG. 29. The switch further comprises a cylindrical part 202*c* composing a part of the sealed container of the switch: and a L-shaped supporting part 202A*c* extending downwards from the cylindrical part. An adjusting screw 318 is screwed in the end portion of the L-shaped supporting part 202A*c*, thereby abutting the lower end of a bottom plate 203*c*. The bottom plate 203*c* is made of an elastic material in the form of a diaphragm, having a wave-like part 203A*c* provided near along the circumference of the bottom plate 203*c*. Therefore, the bottom plate 203*c* can be considerably moved upwards or downwards by means of the adjusting screw 318. If necessary, the adjusting screw 318 may be provided with a scale for indicating the sensitivity of the switch.

The methods of increasing the accuracy and range in adjusting the sensitivity of the switch and of fabricating the switch of the variable type as described above, can be applied to all the switches described above.

We claim:

1. A positive or negative acceleration operated conductive liquid switch for a horizontally moving apparatus which comprises: at least one sealed container which is to be mounted on the horizontally moving apparatus and has electrically conductive contact means to selectively open and close at least one electrical circuit to provide respectively first and second operating modes thereof; and electrically conductive fluid contained in the sealed container and adapted to electrically communicate with the electrically conductive contact means, the electrically conductive contact means and the electrically conductive fluid being arranged so that the electrically conductive contact means operates to selectively connect the electrical circuit in the first of said operating modes upon only gravity being applied to the electrically conductive fluid, but, when acceleration in a horizontal direction and the gravity are simultaneously applied to the electrically conductive fluid, the electrically conductive fluid is deformed to cause the electrically conductive contact means to connect the electrical circuit in the second of said operating modes both in the case where a first acceleration in a horizontal direction exceeding a first threshold value which is relatively low is applied in one direction for a first duration period which is relatively long and in the case where a second acceleration in a horizontal direction exceeding a second threshold value which is relatively high is applied in one direction for a second duration period which is relatively short.

2. A positive or negative acceleration operated conductive liquid switch for a horizontally moving apparatus as claimed in claim 1, which comprises first and second sealed containers each of which has at least one pair of electrically conductive contacts and is to be mounted on the horizontally moving apparatus, the electrically conductive contacts in the first and second sealed containers being connected in parallel to each other; and first and second electrically conductive fluids contained respectively in the first and second sealed containers, the first and second electrically conductive fluids causing the respective electrically conductive contacts to be electrically disconnected for a period during which only gravity is applied to the first and second electrically conductive fluids, the first electrically conductive fluid causing the electrically conductive contacts of the first sealed container to be electrically connected when the first acceleration and the gravity are simultaneously applied to the first electrically conductive fluid for the first duration period, and the second electrically conductive fluid causing the electrically conductive contacts of the second sealed container to be electrically connected when the second acceleration and the gravity are simultaneously applied to the second electrically conductive fluid for the second duration period.

3. A positive or negative acceleration operated conductive liquid switch as claimed in claim 1, which comprises first and second sealed containers each of which has at least one pair of electrically conductive contacts and is to be mounted on the horizontally moving apparatus, the electrically conductive contacts being connected in series to each other; and first and second electrically conductive fluids contained respectively in the first and second sealed containers, the first and second electrically conductive fluids causing the respective electrically conductive contacts to be electrically connected for a period during which only gravity is applied to the first and second electrically conductive fluids, the first electrically conductive fluid causing the electrically conductive contacts of the first sealed container to be electrically disconnected when the first acceleration and the gravity are simultaneously applied to the first electrically conductive fluid for the first duration period, and the second electrically conductive fluid causing the electrically conductive contacts of the second sealed container to be electrically disconnected when the second acceleration and the gravity are simultaneously applied to the second electrically conductive fluid for the second duration period.

4. A positive and negative acceleration operated conductive liquid switch as claimed in claim 1, which comprises: a container including a cone-shaped bottom part and a cylindrical part extending from the cone-shaped bottom part; and electrical insulating lid inserted in the container along the inside of the bottom part so as to form a sealed room; a proper quantity of electrically conductive fluid enclosed in the electrically conductive fluid enclosed in the sealed room; a first electrode connected to the lower end of a conductor penetrating through a protruded portion extending downwards from the center of the lid; a ring-shaped second electrode with a surface confronting the cone-shaped bottom part substantially at a constant distance; and a spatial part formed around the protruded portion and in succession with the sealed room, the electrically conductive fluid being maintained in contact with the first electrode and the second electrode thereby forming an electrical circuit for a period during which only gravity is applied to the electrically conductive fluid, moving outwards along the cone-shaped bottom part when the first acceleration and the gravity are simultaneously applied to the electrically conductive fluid for the first duration period, and allowing a part of the electrically conductive fluid to move into the upper part of the spacial part to open the electrical circuit when the second acceleration and the gravity are simultaneously applied to the electrically conductive fluid for the second duration period.

5. A positive and negative acceleration operated conductive liquid switch as claimed in claim 2, which comprises a control member provided at a passage, into which the electrically conductive fluid is moved upon application of acceleration, so as to control movement of the electrically conductive fluid, thereby to obtain desired responsive conditions of the switch.

6. A positive and negative acceleration operated conductive liquid switch as claimed in claim 3, which comprises a control member provided at a passage, into which the electrically conductive fluid is moved upon application of acceleration, so as to control movement of the electrically conductive fluid, thereby to obtain desired responsive conditions of the switch.

7. A positive and negative acceleration operated conductive liquid switch as claimed in claim 5, in which at least a pair of electrically conductive contacts and the control members for controlling the movement of the electrically conductive fluid are coaxially arranged in a horizontal plane.

8. A positive and negative acceleration operated conductive liquid switch for a horizontally moving apparatus which comprises: a sealed container which has at least one pair of electrically conductive contacts and is to be mounted on the horizontally moving apparatus; and an electrically conductive fluid contained in the sealed container and adapted to electrically communicate with the electrically conductive contacts, the sealed container having a part adapted to be deformed to adjust sensitivity of the switch with respect to acceleration applied thereto in a horizontal direction, said deformable part of said sealed container being a cylindrical part, the cross-section of the cylindrical part being deformed, for instance, from an ellipse to a circle or vice versa to increase or decrease the volume of an interior space in the sealed container where the electrically conductive fluid is contained and accordingly to raise or lower the upper surface of the electrically conductive fluid, whereby the switch is adjusted to respond to a predetermined acceleration which is applied to the switch in a horizontal direction.

* * * * *